Sept. 11, 1962 C. M. ASHLEY 3,053,166
APPARATUS FOR BLANCHING FOOD PRODUCTS
Original Filed Nov. 14, 1951 4 Sheets-Sheet 1
FIG. 1
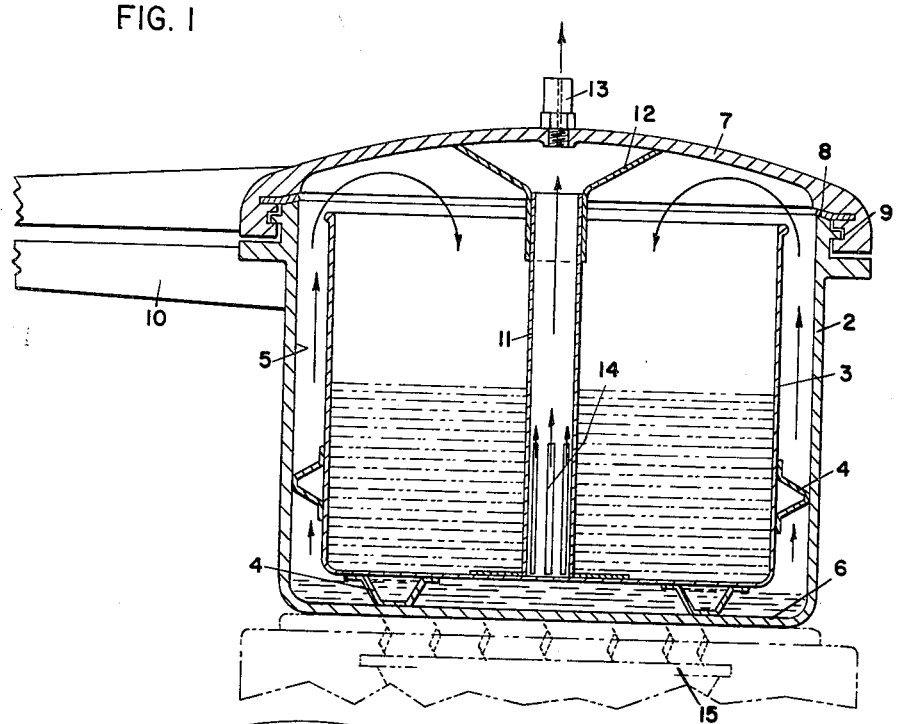
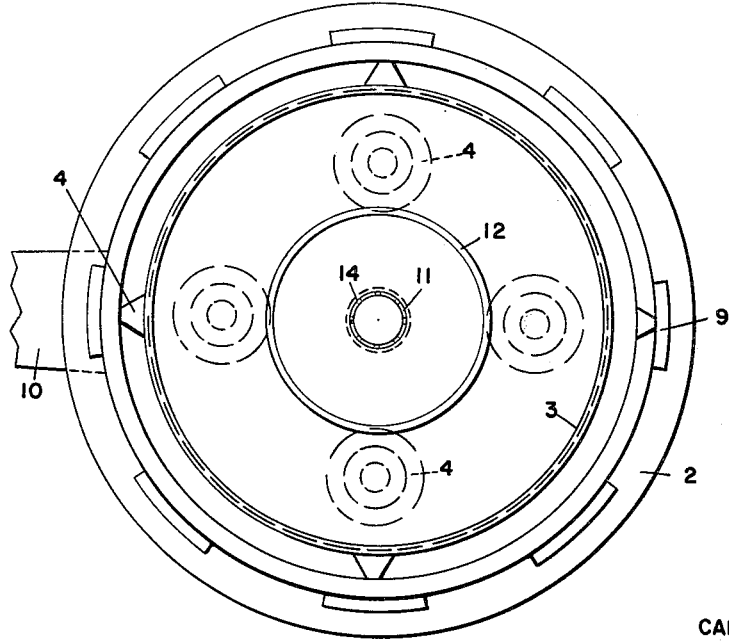
FIG. 2
INVENTOR.
CARLYLE MARTIN ASHLEY
BY *Herman Seid.*
ATTORNEY.

Sept. 11, 1962      C. M. ASHLEY      3,053,166
APPARATUS FOR BLANCHING FOOD PRODUCTS
Original Filed Nov. 14, 1951      4 Sheets-Sheet 3

INVENTOR.
CARLYLE MARTIN ASHLEY
BY
ATTORNEY.

Sept. 11, 1962  C. M. ASHLEY  3,053,166
APPARATUS FOR BLANCHING FOOD PRODUCTS
Original Filed Nov. 14, 1951  4 Sheets-Sheet 4

*INVENTOR.*
CARLYLE MARTIN ASHLEY
BY
*Herman Seid*

ATTORNEY.

United States Patent Office 3,053,166
Patented Sept. 11, 1962

3,053,166
APPARATUS FOR BLANCHING FOOD PRODUCTS
Carlyle Martin Ashley, Fayetteville, N.Y., assignor to Carrier Corporation, Syracuse, N.Y., a corporation of Delaware
Original application Nov. 14, 1951, Ser. No. 256,315, now Patent No. 2,870,020, dated Jan. 20, 1959. Divided and this application July 15, 1958, Ser. No. 748,688
5 Claims. (Cl. 99—251)

This application is a division of copending application, Serial No. 256,315, filed November 14, 1951, entitled "Method and Apparatus for Blanching Food Products," now Patent No. 2,870,020, granted January 20, 1959. This invention relates to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are washed away. It may result in a relative loss in weight in the final product which is extremely serious in commercial applications since the product is sold by weight. The water supply too may affect the texture, appearance, odor, flavor, nutritive value or storage life of the product since it may contain materials injurious to any or all of such factors; to avoid damage to the food product from the water supply, it is customary in larger freezing plants to provide expensive water treatment equipment. In cooking food, the object is generally to soften and break down the wall structure of the food product. Blanching, on the other hand, is not a cooking process, but is merely a preparatory step to freezing in order to assure the freshness of food after it has been stored for a period of time. In blanching, the object is to kill certain bacteria and to destroy certain enzymes which are contained in the food product and which, after a period of time, might spoil or otherwise render unpalatable, the food product. This is particularly important in the processing of frozen foods which are to be stored for long periods of time and which, therefore, must be blanched in order to assure their wholesomeness when they are subsequently prepared for table use. It is the object of the blanching process merely to raise the temperature of the food for a short interval of time sufficient to kill the undesired bacteria and to break down destructive food enzymes while at the same time, leaving the food in a substantially uncooked state.

One of the significant advantages of applicant's apparatus is that he is enabled to achieve blanching of the food product without the usual reduction in vitamin and mineral content of the food and without substantial loss of weight. By use of the apparatus described and claimed in this application, a substantial portion of the vitamins and minerals which are normally lost from the food product are subsequently returned to it. This is achieved by returning at least a fraction of the food juices to the food by reducing the pressure within the vessel so that the juices vaporize and recondense over the food prior to its removal from the blanching vessel.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantage of steam blanching and water cooling.

A still further object is to provide apparatus for steam blanching and subsequent cooling of food products adapted for domestic use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to apparatus for blanching and cooling food products which comprises, in combination, means for supplying a heated vapor over the food product to heat the same thereby condensing at least a portion of the vapor, means for collecting at least a portion of the nutrients given off by the food product when it is contacted by the vapor; and means for distributing at least a portion of the collected nutrients over the food product to restore a substantial portion of the original nutrient content.

The attached drawings illustrate preferred embodiments of the invention, in which—

FIGURE 1 is a view in section of a blanching and cooling device for domestic use;

FIGURE 2 is a plan view of the device shown in FIGURE 1 having the cover removed;

Figure 3:
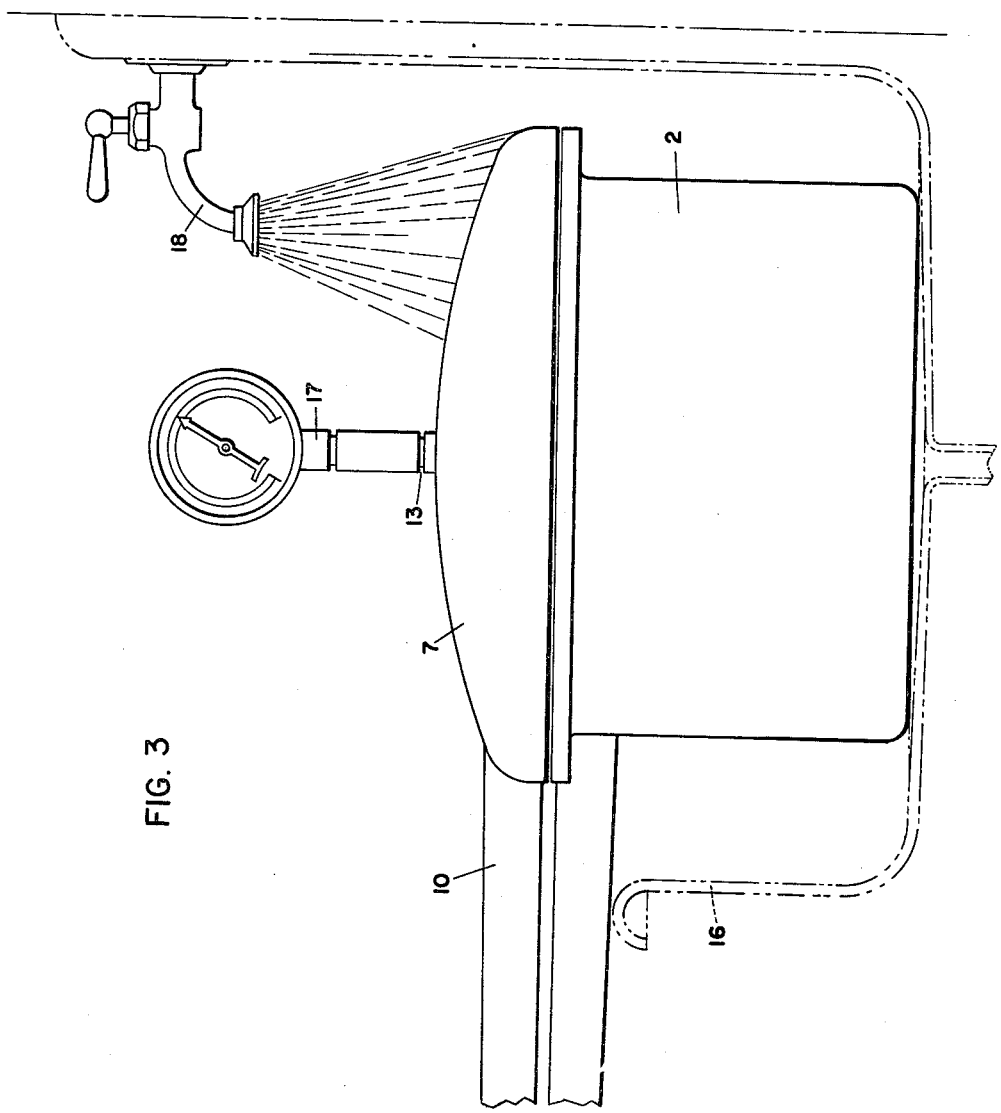
FIGURE 3 is a view in elevation of the blanching and cooling device shown in FIGURE 1 during the cooling and rewetting operation.

Referring to the drawings, there is shown in FIGURE 1 a simple, economical blanching device for domestic use embodying the invention. The device comprises an outer vessel or pan 2 and an inner vessel or pan 3. Spacing members 4 are provided, preferably attached to vessel 3, to space vessel 3 from the wall 5 and bottom 6 of vessel 2 thereby forming a passageway between the inner and outer vessels for a purpose hereinafter explained. A cover 7 fits over vessel 2, a gasket 8 being securely clamped between the cover and vessel 2 to seal the vessel. Any suitable means such as lugs 9 may be used to attach the cover to the vessel. A handle 10 may be attached to vessel 2 to permit ready and easy handling thereof. The bottom of the outer vessel 2 forms a sump below vessel 3 for a liquid medium such as water.

A tube 11 is placed centrally of inner vessel 3 and extends substantially vertical from the bottom adjacent the cover. The upper portion of tube 11, preferably a flexible extension 12 thereof, of any suitable flexible material such as rubber contacts the cover 7. A pressure relief vent 13 such as is commonly employed in pressure cooking apparatus is placed in the cover within the area of extension 12. Slits or slots 14 forming apertures adjacent the bottom of the tube 11 permit communication between the inner vessel 3 and the interior of the tube 11, the tube 11 serving as a passageway to connect the interior of vessel 3 with the ambient atmosphere under the conditions stated below.

Considering the use of this device for domestic blanching, the food product is placed within vessel 3 and the cover 7 is applied to vessel 2 securely closing the vessel. Water in the sump of vessel 2 is heated by any suitable heating member such as the gas burner 15 of a stove. The water boils, steam vapor flowing upward through the passageway between the inner and outer vessels and downward in the inner vessel thereby displacing the heavier air or other non-condensible gases downward in the inner vessel, forcing the non-condensible gases through the slots 14 into tube 11 and venting the non-condensible gases to the ambient atmosphere. A minor portion of the steam is of course vented to the atmosphere, but the purging of air is done very completely, since its downward displacement prevents appreciable mixture with the steam.

The vapor passing over the surfaces of the food product in the inner vessel heats the same while condensing in part upon the surfaces of the food product. The heating operation releases the juices of the food product as well as dissolves solids such as vitamins and minerals in the condensate. The heating operation is discontinued after a predetermined heating period, the length of which depends upon the kind of food product being blanched. In domestic blanching, the heating period may be discontinued by extinguishing the gas burner 15 or by removing the closed vessel therefrom.

Figure 4:
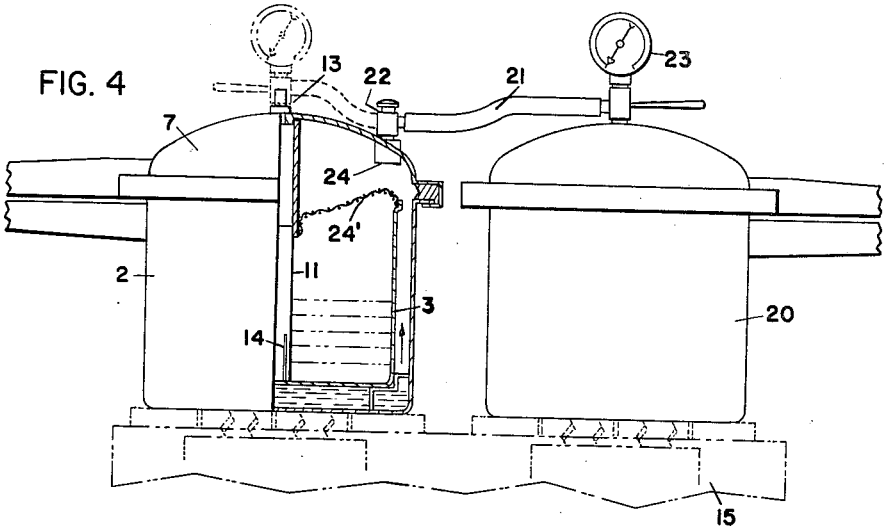
FIGURE 4 is a view partly in section and partly in elevation of a blanching device having an additional steam supply.

Preferably, in domestic blanching, the closed vessel 2 is removed immediately from the stove to the sink 16 (refer to FIGURE 3). A vacuum gauge 17, as shown in FIGURE 3, is attached to the vent 13 to close the passageway between the inner vessel and ambient atmosphere. The vacuum gauge may conveniently be the type which slips over pressure relief vent 13 as shown in FIGURES 3 and 4. It will be appreciated that appropriate means (not shown) such as a gasket may be provided to form a vacuum tight seal between vent 13 and the vacuum gauge in order to assure that the vent device is closed by the vacuum gauge. A stream of cooling water from a faucet is directed over the cover 7. The cooling water condenses the vapor in vessel 3, decreasing the pressure therein and thereby causing evaporation of condensate from the food product to cool the same. The decrease in pressure in vessel 3 causes condensate and juices collected at the bottom thereof to boil upwardly through the food product to rewet the same thereby restoring the original weight of the food product and returning at least a portion of the original nutrients to the food product. Since the presence of even a slight trace of air or non-condensibles greatly retards the condensing on the vessel and evaporation from the food, it is highly important that the vessel be sealed securely and that all of the air be vented during the heating process.

The vapor in vessel 3 contacts the cover 7, condenses and runs down the cover and inner wall 5 of the outer vessel 2 to the sump in the bottom of the outer vessel. The water condensed on the food product during the heating operation is in roughly the same amount as the amount of water evaporated therefrom during cooling through approximately the same temperature range. The juices are retained in the inner pan or vessel with the food product and are frozen therewith during the subsequent freezing operation. Any slight amount of juice remaining in the inner pan is usually poured over the food in the freezing package thus returning virtually all of the dissolved solids to the food.

The blanching operation described iactivates the enzymes without affecting adversely the flavor, texture, appearance or odor of the food product and maintains the nutritive value since the nutrients are reutrned to the food product. In addition, substantially the original weight of the product is restored although this is of less value in domestic blanching than in commercial blanching.

Under some circumstances, it may be desirable to furnish an additional quantity of steam to the blanching device to expedite the operation. FIGURE 4 illustrates a modification of the invention in which a supplemental steam supply is provided. A second vessel 20 is placed adjacent vessel 2 on the heating means 15 and is connected to vessel 2 by a flexible line 21 and connection 22. Vessel 20 is provided with a pressure regulator 23 so that a quantity of water may be heated initially to a higher temperature than the boiling temperature to supply an immediate source of steam to vessel 2. The end of connection 22 within vessel 2 may be provided with a diffuser 24 to diffuse steam from vessel 20 within vessel 2. Steam, of course, is introduced at the top of the vessel to assure non-condensible gases being purged therefrom. At the end of the heating operation the gauge is removed from vessel 20, placed on the vent connection of vessel 2 thus sealing it and the cooling and rewetting operation conducted as previously described. A foam breaker 24' is preferably provided at the top of the inner vessel 3 and may comprise a wire gauze.

Figure 5:
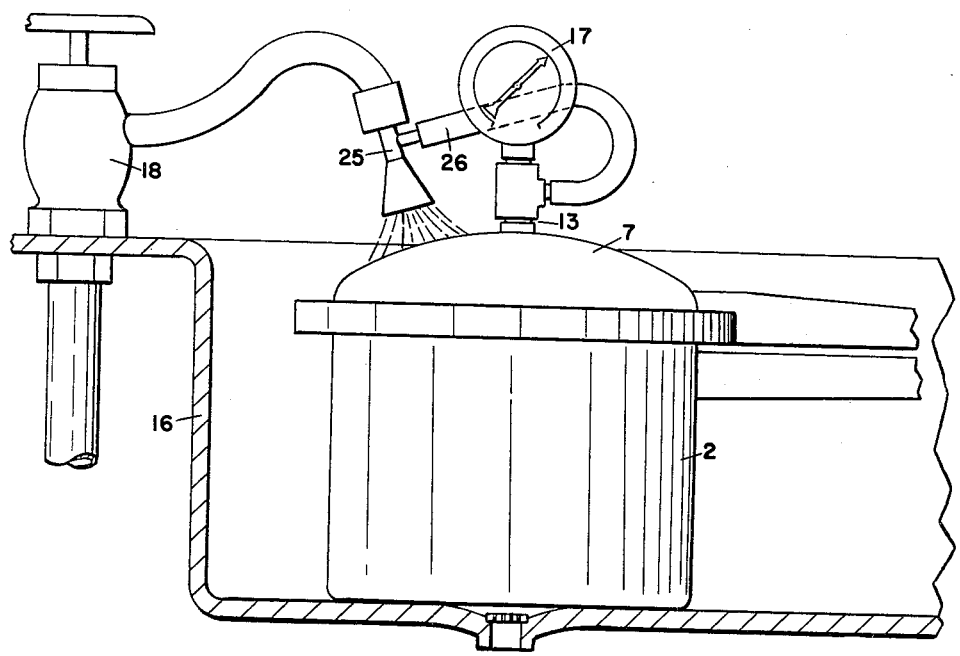
FIGURE 5 is a view in elevation of a blanching and cooling device similar to the device shown in FIGURE 1 provided with an additional means for purging non-condensible gases.

In FIGURE 5, I have shown the blanching device provided with additional purge means which may be desirable under some conditions. A water ejector 25 is placed on the faucet 18 and the vent 13 is connected thereto by a line 26. This ejector permits the vacuum in vessel 2 to be drawn to a point corresponding to the vapor pressure of the water. To increase vapor removal from the food chamber (by condensation), the water from ejector 25 is sprayed on the cover 7 of vessel 2. With this arrangement, complete venting during the heating operation is relatively unimportant since the effect of slight leaks in vessel 3 is offset thus assuring the lowest possible final temperature of the food product.

Figure 6:
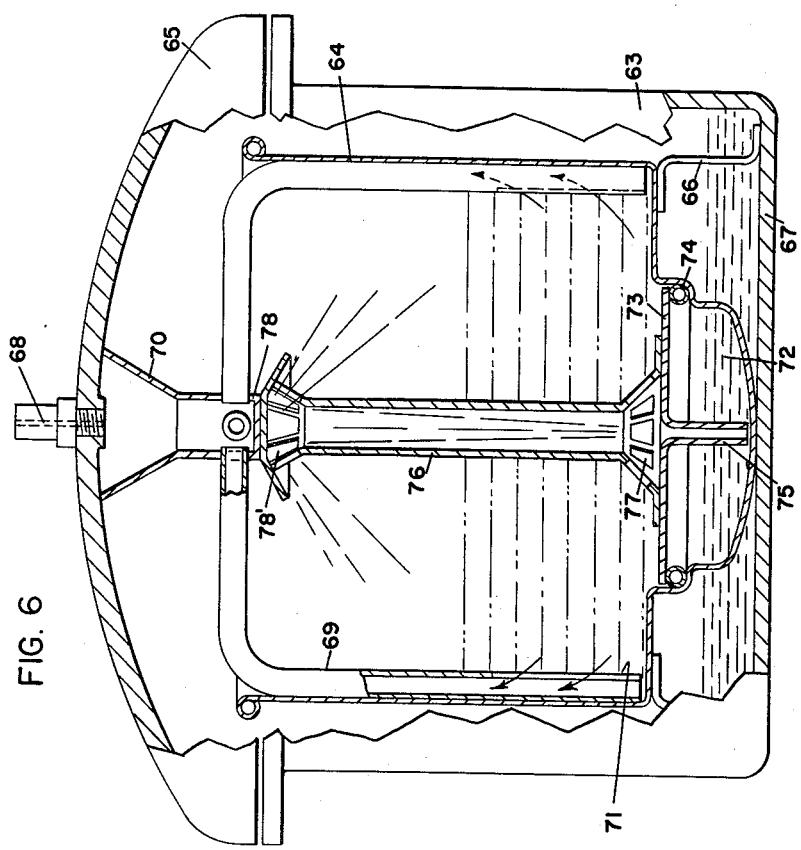
FIGURE 6 is a sectional view of a modified blanching and cooling device.

In FIGURE 6 there is shown a modified blanching device for domestic use. This device comprises an outer vessel on pan 63 and an inner vessel or pan 64. A cover 65 securely closes vessel 63. Pan 64 is supported some distance from the bottom of pan 63 by a support member 66. The bottom of pan 63 forms a sump 67 for liquid heating medium. The usual pressure release vent 68 is formed in cover 65. Tubes 69 are provided adjacent the wall interior of pan 64 and lead to an extension 70 adjacent cover 65. The bases of tubes 69 are provided with slots 71 which form apertures therein. Tubes 69 and extension 70 form a passageway connecting the inner pan with ambient atmosphere in order that non-condensible gases may be removed from the vicinity of the food product.

A condensate pan 72 extends downward from pan 64 within sump 67. Pan 72 is provided with a cover 73, gasket 74 sealing the space between cover 73 and the wall of pan 72. A tube 75 extends downward in pan 72.

A tube 76 placed centrally of pan 64 extends upward therein. Tube 76 is provided with slots 77 to permit condensate to flow into tube 75 and to collect within pan 72. A target 78 is placed above tube 76.

During the blanching operation, condensate flows from pan 64 through slots 77 and tube 75 into pan 72. Upon reduction of pressure in vessel 64 during the cooling operation, condensate in pan 72 boils or percolates, thus carrying vapor and drops of condensate upward in tubes 75 and 76 against the target 78, which serves to distribute this spray through slots 78' over the food product in pan 64. The essential feature of this device, of course, resides in the use of boiling or percolating mechanism to distribute condensate over the surface of the food product during the cooling operation. If desired, steam for the blanching operation may be provided from a separate source, the vent 68 into vessel 63 being closed during the cooling operation.

The present invention provides a simple, ready, economical method of blanching food products and cooling the same which may be practiced in domestic blanching operations. The method provided by my invention assures that juices and dissolved solids are returned to the food product before freezing and restores substantially the initial weight of the product, which is of particular value in commercial operations.

It will be appreciated if the food product is heated through the same range as it is cooled, substantially no change in weight of the food product will occur. The food will absorb substantially all of the juices since heating followed by cooling increases the absorptive capacity.

While I have described a preferred embodiment of the invention, it will be understood the invention is not limited thereto since it may be otherwise embodied within the scope of the following claims.

I claim:

1. In an apparatus for blanching food products the combination of an outer vessel, disengageable cover means for securely closing and sealing said outer vessel from the entrance of ambient air therein, pressure relief vent means in said cover means communicating the interior of said outer vessel with ambient atmosphere, means to close said pressure relief vent, said outer vessel being adapted to be substantially sealed from the entrance of ambient air by closure of said pressure relief vent, an inner vessel having an open top and imperforate bottom and side walls located within and spaced from the outer vessel, said inner vessel having a portion adapted to contain a food product to be blanched, said inner and outer vessel freely communicating with each other adjacent their respective upper portions, a tube in said inner vessel communicating at its lower end with the lower portion of said inner vessel and communicating at its upper end with said pressure relief vent means, means for generating steam in the outer vessel comprising a sump adapted to contain water so that in operation, steam generated in said outer vessel passes downwardly into the inner vessel and displaces the noncondensible gases from the area of the food product forcing them up through said tube and thence through said pressure relief vent, said steam also serving to heat the food product and forming condensate thereon which dissolves nutrients from said food product, said condensate having dissolved nutrients therein being collected in the lower portion of the inner vessel, said apparatus upon external cooling thereof and closure of said pressure relief vent operating to evaporatively cool the food product by the evaporation of condensate on the food product and simultaneously to boil and pass upwardly the condensate having dissolved nutrients therein which is collected in the inner vessel to distribute said condensate and nutrients over the food product thereby restoring a substantial portion of the nutrient content thereto.

2. An apparatus as defined in claim 1, further comprising a pan in said inner vessel, a second tube in said inner vessel having an opening adjacent the bottom of said pan, a target located above said inner pan and adapted to receive the impact of condensate having dissolved nutrients therein which is percolated up through said second tube upon a reduction of pressure in said inner vessel, so that substantial portions of said condensate and dissolved nutrients are thereby distributed over said food product and returned thereto.

3. Apparatus according to claim 1, further comprising means external of the outer vessel for supplying additional steam to said inner vessel.

4. Apparatus according to claim 2, further comprising a cover over the pan whereby the second tube places the pan and the area containing the food product into communication.

5. In an apparatus for blanching food products the combination of an outer vessel, disengageable cover means for securely closing and sealing said outer vessel from the entrance of ambient air therein, pressure relief vent means in said cover means communicating the interior of said outer vessel with ambient atmosphere, means to close said pressure relief vent, said outer vessel being adapted to be substantially sealed from the entrance of ambient air by closure of said pressure relief vent, an inner vessel having an open top and imperforate bottom and side walls located within and spaced from the outer vessel, said inner vessel having a portion adapted to contain a food product to be blanched, said inner and outer vessel freely communicating with each other adjacent their respective upper portions, a tube in said inner vessel communicating at its lower end with the lower portion of said inner vessel and communicating at its upper end with said pressure relief vent means by an axially flexible tubular extension sealingly engaging said cover means and surrounding said pressure relief vent to direct noncondensible gases which pass upwardly in said tube outwardly of said vessels thereby substantially preventing them from passing back into said inner and outer vessels, means for generating steam in the outer vessel comprising a sump adapted to contain water so that in operation, steam generated in said outer vessel passes downwardly into the inner vessel and displaces the noncondensible gases from the area of the food product forcing them up through said tube and thence through said pressure relief vent, said steam also serving to heat the food product and forming condensate thereon which dissolves nutrients from said food product, said condensate having dissolved nutrients therein being collected in the lower portion of the inner vessel, said apparatus upon external cooling thereof and closure of said pressure relief vent operating to evaporatively cool the food product by the evaporation of condensate on the food product and simultaneously to boil and pass upwardly the condensate having dissolved nutrients therein which is collected in the inner vessel to distribute said condensate and nutrients over the food product thereby restoring a substantial portion of the nutrient content thereto.

References Cited in the file of this patent

UNITED STATES PATENTS

| 1,258,995 | Demuth | Mar. 12, 1918 |
| 1,444,043 | Slocomb | Feb. 6, 1923 |
| 1,740,205 | Schmidt | Dec. 17, 1929 |

FOREIGN PATENTS

| 338,573 | France | May 28, 1904 |
| 474,594 | Italy | Sept. 26, 1952 |

UNITED STATES PATENT OFFICE
CERTIFICATE OF CORRECTION

Patent No. 3,053,166                      September 11, 1962

Carlyle Martin Ashley

It is hereby certified that error appears in the above numbered patent requiring correction and that the said Letters Patent should read as corrected below.

Column 3, line 71, for "iactivates" read -- inactivates --; line 74, for "reutrned" read -- returned --; column 4, line 39, for "on" read -- or --.

Signed and sealed this 2nd day of April 1963.

(SEAL)
Attest:

ESTON G. JOHNSON

Attesting Officer

DAVID L. LADD

Commissioner of Patents